United States Patent [19]

Nelson

[11] Patent Number: 4,817,647
[45] Date of Patent: Apr. 4, 1989

[54] METHOD OF REMOVING OIL FROM A GOLF COURSE

[75] Inventor: James H. Nelson, Corunna, Canada

[73] Assignee: Green Kleen International Inc., Port Huron, Mich.

[21] Appl. No.: 115,394

[22] Filed: Nov. 2, 1987

[51] Int. Cl.$^4$ ............................................... B08B 7/00
[52] U.S. Cl. ......................................... 134/40; 134/42
[58] Field of Search .................. 210/924, 242.4, 502.1; 134/40, 42; 55/DIG. 45

[56] References Cited

U.S. PATENT DOCUMENTS

| | | | |
|---|---|---|---|
| 4,107,051 | 8/1978 | Lorentzen | 210/924 |
| 4,111,813 | 9/1978 | Preus | 210/924 |
| 4,395,336 | 7/1983 | Eng | 210/924 |
| 4,395,352 | 7/1983 | Klein | 210/502.1 |
| 4,439,324 | 3/1984 | Crotti | 210/924 |
| 4,759,847 | 7/1988 | Medbury | 210/502.1 |

Primary Examiner—H. M. S. Sneed
Assistant Examiner—Sharon T. Cohen
Attorney, Agent, or Firm—Fetherstonhaugh & Co.

[57] ABSTRACT

A method of removing oil from a golf course is disclosed. In this invention, an absorbent mat is applied to the oil spill site to absorb an initial amount of the oil. The mat is removed after a sufficient period of time, and then, a surfactant is applied to the spill site. A second absorbent mat is, in turn, applied to the spill site in order to absorb a further amount of the oil and an initial amount of the surfactant. Water is then applied to the spill site to flush away the residual oil and surfactant.

4 Claims, 1 Drawing Sheet

METHOD OF REMOVING OIL FROM A GOLF COURSE

BACKGROUND OF THE INVENTION

1. Field of the Invention

This invention relates to a method of removing oil from an elongated oil site on a grass lawn, and more particularly, from an oil site on a golf course caused by hydraulic mowing equipment.

2. Description of the Prior Art

Hydraulic mowing equipment is commonly used to cut the grass on golf course fairways and putting greens. Occasionally, however, ruptures or holes occur in the hydraulic lines of such hydraulic mowing equipment, thereby leaking hot hydraulic oil on the golf course as the equipment is driven across the course, and as a result, an elongated oil spill may be formed. As the spill may not become clearly visible to the operator until the direction of movement of the mower is reversed, very long spills can thereby occur which cause significant damage to the grass, and which are expensive to repair.

While it is impossible to predict when an oil leak will occur, it is essential that corrective action be taken as soon as possible, in order that damage to the turf or grass is minimized. Previous methods for treating and removing oil spills from golf courses have, however, been unsuccessful in providing a simple method which reduces the time required for complete turf recovery.

One known method for attempting to remove oil spills from golf courses involves the use of activated charcoal. This method generally involves the spreading of the charcoal on top of the spill site, to thereby absorb the oil from the soil. This method, however, involves a moderate degree of effort and results in a relatively lengthy period of time before the damaged grass returns to its normal state, as it does not remove oil from the "crown" of the grass. Moreover, this method generally results in an unsightly stain to the golf course.

Another known method for attempting to remove such oil spills involves an application of a detergent solution to the spill site, followed by the flushing of water. This method, however, tends to have the undesireable effect of spreading the hydraulic fluid to a wider area of the grass, thereby increasing the size of the oil spill.

SUMMARY OF THE INVENTION

It is an object of this invention to provide a method for removing oil from an elongated oil spill site on a grass lawn which greatly reduces the length of time required for complete turf recovery.

It is a further object of this invention to provide a method of removing oil from an elongated oil spill on a grass lawn which is simple to use.

According to a broad aspect of the present invention, there is provided a method of removing oil from an elongated oil spill site from a grass lawn comprising, applying a first absorbent cover to at least a substantial section of the length of the elongated oil spill site of a sufficient dwell time to ensure that it will remove at least an initial amount of oil from the site to provide a partially cleaned site; removing said absorbent cover from the surface of said partially cleaned site; applying a surfactant to said partially cleaned site; applying a second absorbent cover to said partially cleaned site for a sufficient dwell time to ensure that it will absorb an initial amount of the surfactant and a further amount of oil from the partially cleaned site; removing said second absorbent cover from said partially cleaned site; applying water to the surface of said partially cleaned site to flush the remaining residual oil and surfactant from the grass lawn.

BRIEF DESCRIPTION OF THE DRAWINGS

This invention will be more clearly understood after reference to the following detailed specification, read in conjunction with the drawings, wherein.

DETAILED DESCRIPTION OF THE INVENTION

Figure 1:
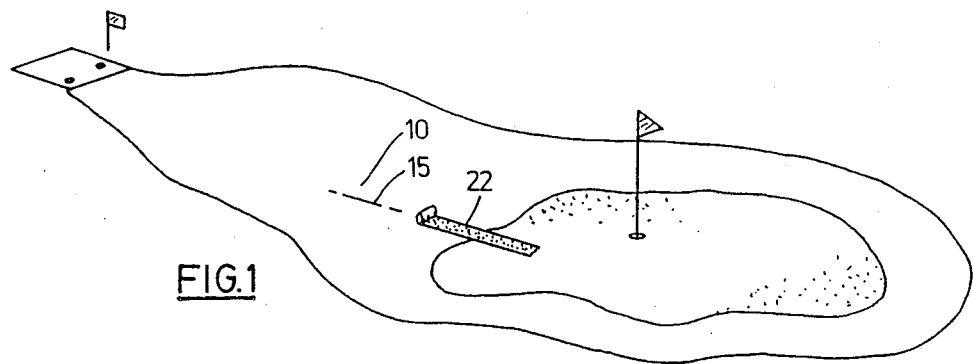
FIG. 1 is a perspective view of an oil spill site on a golf course.
Figure 2:
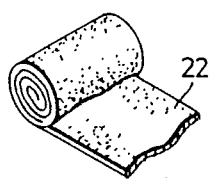
FIG. 2 is a perspective view illustrating a roll of the absorbent cover.
Figure 3:
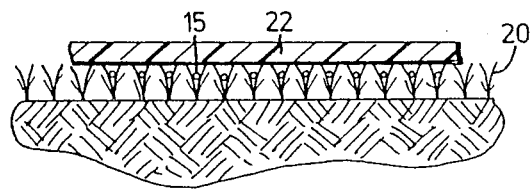
FIG. 3 is a cross-sectional view illustrating the absorbent cover applied to the oil spill site.

With reference to FIGS. 1-3 of the drawings, the reference numeral 10 refers generally to a typical elongated oil spill site that is formed on a golf course by a leak in a hydraulic fuel line on the mowing equipment. The leaked hydraulic fuel or oil 15 that is most harmful to the grass plant is that which is deposited in the "crown" 20 of the grass, which is formed between the leaves of each blade of grass. The oil which spills onto the soil is generally less harmful to the plant's growth and appearance.

Upon discovering the hydraulic fuel leak, which is generally apparent to the eye, a greenskeeper applies an absorbent cover 22 to the spill site. Preferably, the absorbent cover 22 should be applied to the spill site 10 within fifteen minutes of the hydraulic leak, in order to reduce the potential for longer term damage to the grass.

The absorbent cover 22 can conveniently be stored in a roll and transported by the greenskeeper on the hydraulic mowing equipment, so that the corrective procedure may be initiated as soon as possible. It has been found that a particularly effective absorbent cover 22 is a non-woven mat of cellulose material such as that manufactured by Matarah Industries Inc., and identified by the trade mark SORBEX.

Figure 4:
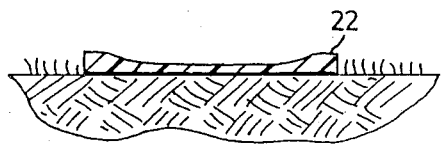
FIG. 4 is a cross-sectional view illustrating the absorbent cover applied, with pressure, to the oil spill site.
Figure 5:
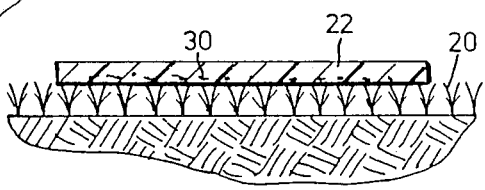
FIG. 5 is a cross-sectional view illustrating the absorbent cover having absorbed an initial amount of oil from the spill site; and, FIG. 6 is a perspective view illustrating the application of the surfactant to the oil spill site.

As shown in FIGS. 3, 4 and 5, the absorbent cover 22 is rolled out onto a section of the spill site 10 to remove, by absorption, an initial amount of the hydraulic fluid 15 from the grass. This initial amount of fluid 15 which is soaked up by the absorbent cover 22 may be increased by applying pressure to the absorbent cover, as depicted in FIG. 4. This added pressure may be easily applied by the greenskeeper by walking along the length of the absorbent cover 22. This initial step serves to remove a substantial quantity of oil from the "crown" of the grass plant and this greatly improves the likelihood of survival.

Figure 6:
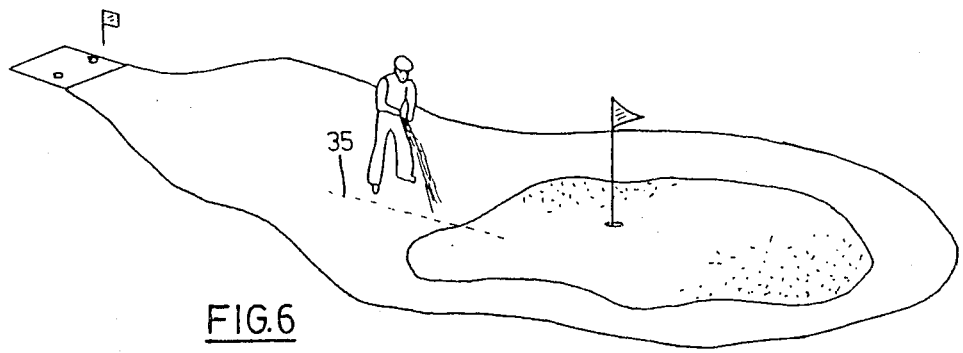

Once the initial amount of oil 15 is absorbed by the absorbent cover 22, the absorbent cover 22 is removed from the spill site 10 to provide a partially cleaned site. The greenskeeper, as depicted in FIG. 6, then applies a liquid surfactant 35 to the area of the spill site, from which the absorbent cover 22 has been removed. This surfactant 35 is used to elevate any residual oil which remains in the crown of the grass 20 and is preferably applied to the partially cleaned spill site 10 by a lightly pressured stream. It has been found that household dishwasher detergent, diluted to 10% of its original strength, is a suitable and effective surfactant 35.

After the application of the surfactant 35, a second absorbent cover 22 is applied to the partially cleaned spill site, in the same manner as described above with respect to the first absorbent cover, and as depicted in FIGS. 1 to 5. This second absorbent cover 22 thereby absorbs a further amount of oil 15 from the partially cleaned site, together with an initial amount of the surfactant 35.

After the removal of this second absorbent cover 22 from the partially cleaned site, water is applied to the surface of said spill site 10 to flush away any remaining residual oil 15 and surfactant 35 from the grass.

A typical absorbent cover may measure 6" wide and 3/16" in thickness and may be provided in rolls of about 75' in length.

Various modifications of the present invention will be apparent to those skilled in the art without departing from the scope of the invention.

I claim:

1. A method of removing oil from an elongated oil spill site on a grass lawn, wherein oil is trapped in the crowns of the grass plants and is spread on the surrounding soil in which the grass plants are growing, comprising:
   applying a first absorbent cover to at least a substantial portion of the length of said elongated oil spill site to remove at least an initial amount of oil from the crowns of the grass plants and the surrounding soil to provide a partially cleaned site;
   removing said first absorbent cover from the surface of said partially cleaned site;
   applying a surfactant to said partially cleaned site to release a substantial portion of the remaining oil from the crowns of the grass plants and the surrounding soil;
   applying a second absorbent cover to said partially cleaned site to absorb an initial amount of the surfactant and the oil which is released from the crowns of the grass plants and the surrounding soil;
   removing said second absorbent cover from said partially cleaned site;
   applying water to the surface of said partially cleaned site to flush the remaining residual oil and surfactant from the grass lawn.

2. A method of removing oil from an elongated oil spill site from a grass lawn as claimed in claim 1, comprising the further step of applying pressure to the first and second absorbent covers, in order to increase the amount of absorption.

3. A method of removing oil from an elongated oil spill site from a grass lawn as claimed in claim 2, wherein the surfactant is a diluted detergent.

4. A method of removing oil from an elongated oil spill site on a grass lawn, wherein oil is trapped in the crowns of the grass plants and is spread on the surrounding soil in which the grass plants are growing, comprising:
   applying a first absorbent cover, within fifteen minutes of the formation of the oil spill site, to remove at least an initial amount of oil from the crowns of the grass plants and the surrounding soil, to provide a partially cleaned site;
   applying pressure to said first absorbent cover to assist the absorption of said initial amount of oil from the partially cleaned site;
   removing said first absorbent cover from the surface of said partially cleaned site;
   applying a diluted detergent surfactant to said partially cleaned site to release a substantial portion of the remaining oil from the crowns of the grass plants and the surrounding soil;
   applying a second absorbent cover to said partially cleaned site to absorb an initial amount of the surfactant and the oil which is released from the crowns of the grass plants and the surrounding soil;
   applying pressure to said second absorbent cover to assist the absorption of said initial amount of the surfactant and said oil which is released from the crowns of the grass plants and the surrounding soil;
   removing said second absorbent cover from said partially cleaned site;
   applying water to the surface of said partially cleaned site to flush the remaining residual oil and surfactant from the grass lawn.

* * * * *